(12) United States Patent  (10) Patent No.: US 8,922,039 B2
Andersen et al.  (45) Date of Patent: Dec. 30, 2014

(54) WIND TURBINE AND A METHOD FOR POWERING ONE OR MORE HYDRAULIC PITCH ACTUATORS

(75) Inventors: Jesper Lykkegaard Andersen, Hornslet (DK); Jens Bay Madsen, Aarhus C (DK)

(73) Assignee: Vestas Wind Systems A/S, Aarhus N. (DK)

( * ) Notice: Subject to any disclaimer, the term of this patent is extended or adjusted under 35 U.S.C. 154(b) by 509 days.

(21) Appl. No.: 13/325,794

(22) Filed: Dec. 14, 2011

(65) Prior Publication Data

US 2012/0187681 A1 Jul. 26, 2012

Related U.S. Application Data

(60) Provisional application No. 61/435,415, filed on Jan. 24, 2011.

(30) Foreign Application Priority Data

Jan. 24, 2011 (DK) ................................. 2011 00043

(51) Int. Cl.
*F03D 9/00* (2006.01)
(52) U.S. Cl.
USPC .............................................. 290/44; 290/55
(58) Field of Classification Search
USPC .......................................... 290/43, 44, 54, 55
See application file for complete search history.

(56) References Cited

U.S. PATENT DOCUMENTS

| | | | |
|---|---|---|---|
| 4,348,155 A | 9/1982 | Barnes et al. | |
| 6,265,785 B1 * | 7/2001 | Cousineau et al. | 290/44 |
| 7,709,972 B2 * | 5/2010 | Arinaga et al. | 290/55 |
| 7,863,767 B2 * | 1/2011 | Chapple et al. | 290/54 |
| 8,450,868 B2 * | 5/2013 | Tsutsumi et al. | 290/44 |
| 8,502,402 B2 * | 8/2013 | Hamano | 290/43 |
| 2009/0134624 A1 | 5/2009 | Kerber | |

(Continued)

FOREIGN PATENT DOCUMENTS

| | | |
|---|---|---|
| EP | 1 788 237 | 5/2007 |
| WO | 2008040347 A1 | 4/2008 |
| WO | 2010/127885 | 11/2010 |

OTHER PUBLICATIONS

Jens Skou; 1st Technical Examination and Search Report issued in priority Denmark Application No. PA 2011 00043; Oct. 20, 2011; 4 pages; Denmark Patent and Trademark Office.

(Continued)

*Primary Examiner* — Nicholas Ponomarenko
(74) *Attorney, Agent, or Firm* — Wood, Herron & Evans, LLP

(57) ABSTRACT

A wind turbine for producing power to a utility grid includes a rotor having one or more blades, wherein the rotor further includes one or more hydraulic pitch actuators for actively controlling the pitch angle of one or more of the blades. The wind turbine also includes one or more actuator hydraulic pumps adapted for powering the hydraulic pitch actuators, wherein the one or more actuator hydraulic pumps are powered by a normal operation energy source. The wind turbine further includes an emergency hydraulic pump also adapted for powering the hydraulic actuators, the emergency hydraulic pump being powered by an electrical energy storage. A method for powering one or more hydraulic pitch actuators for actively controlling the pitch angle of one or more blades of a wind turbine is also disclosed.

18 Claims, 6 Drawing Sheets

(56) References Cited

U.S. PATENT DOCUMENTS

2010/0237618 A1    9/2010  Arinaga et al.
2012/0134806 A1*   5/2012  Andersen et al. .................. 416/1
2012/0134816 A1*   5/2012  Andersen et al. ............... 416/31
2012/0134828 A1*   5/2012  Andersen et al. ............. 416/147
2012/0187681 A1*   7/2012  Andersen et al. ............... 290/44

OTHER PUBLICATIONS

European Patent Office, European Search Report issued in corresponding EP Application No. 11194124.1-1607/2479429, dated Sep. 24, 2014, 8 pages.
Eric Hau: "Wind Turbines", dated Dec. 29, 2006, pp. 278-279.

* cited by examiner

WIND TURBINE AND A METHOD FOR POWERING ONE OR MORE HYDRAULIC PITCH ACTUATORS

CROSS-REFERENCE TO RELATED APPLICATIONS

This application claims priority under 35 U.S.C. §119(a) to DK Application No. PA 2011 00043, filed Jan. 24, 2011. This application also claims the benefit of U.S. Provisional Application No. 61/435,415, filed Jan. 24, 2011. Each of these applications is incorporated by reference herein in its entirety.

TECHNICAL FIELD

The invention relates to a wind turbine comprising a power generating device or means for producing power to a utility grid. The wind turbine further comprises a rotor including one or more blades, wherein the rotor further comprises one or more hydraulic pitch actuators for actively controlling the pitch angle of one or more of the blades.

The invention further relates to a method for powering one or more hydraulic pitch actuators for actively controlling the pitch angle of one or more blades of a wind turbine.

BACKGROUND

A wind turbine known in the art comprises a tapered wind turbine tower and a wind turbine nacelle positioned on top of the tower. A wind turbine rotor with a number of wind turbine blades is connected to the nacelle through a low speed shaft, which extends out of the nacelle front as illustrated on FIG. 1.

Modern wind turbines control the load on the rotor by pitching the blades in and out of the incoming wind. The blades are pitched to optimize the power output or to protect the wind turbine from damaging overloads.

To perform the pitch, each blade is provided with a pitching arrangement comprising a pitch bearing between the hub and the blade, and some sort of pitch mechanism, e.g., in the form of a hydraulic actuator, to provide the force for pitching the blade and maintaining it in a given position.

This hydraulic actuator is typically powered by a hydraulic pump which is driven by an electrical motor powered by the utility grid to which the wind turbine produces electrical power.

However, in case of grid failure, it can still be necessary to pitch the blades, for example, to shut down the wind turbine by feathering the blades, to control a slow rotation of the rotor during idling, or as a countermeasure in case one or more of the blades oscillates edgewise.

By way of example, from U.S. Pat. No. 4,348,155 it is therefore known to provide the hydraulic system with pressure accumulators so that the blades can be feathered in case of grid failure or a similar malfunction, but the power delivered from accumulators is limited and very short-lived.

From EP 1 788 237 A2 it is therefore known to power the hydraulic pump by the utility grid during normal operation and, for example, by means of a battery during grid failure but such a battery is both heavy and expensive.

One aspect of the invention is therefore to provide for an advantageous technique for powering the hydraulic pitch actuator of a wind turbine.

SUMMARY

The invention provides for a wind turbine comprising a power generating device or means for producing power to a utility grid. The wind turbine further comprises a rotor including one or more blades, wherein the rotor further comprises one or more hydraulic pitch actuators for actively controlling the pitch angle of one or more of the blades. The wind turbine also comprises one or more actuator hydraulic pumps adapted for powering the hydraulic pitch actuators, wherein the one or more actuator hydraulic pumps are powered by a normal operation energy source. The wind turbine further comprises an emergency hydraulic pump also adapted for powering the hydraulic actuators, the emergency hydraulic pump being powered by an electrical energy storage.

The one or more actuator hydraulic pumps driving the pitch actuators during normal operation have to have a relatively high capacity to constantly and rapidly adjust the pitch angle of all the blade, for example, in response to constantly changing wind situations, to adjust to a given power output setting, or other. Thus, in case of emergency, for example, where the normal operation energy source is no longer available, it would require a massive energy storage to ensure pitch operation if this should be conducted by the normal operation actuator hydraulic pumps. But during grid failure or similar circumstances, where the normal operation energy source is not available, the pitch system only has to adjust the pitch angle of the blades relatively slowly and relatively rarely—i.e., if edgewise oscillations of the blades are detected or to ensure a substantially constant slow idling of the rotor. The required capacity of the pumps is therefore severely reduced during periods when the normal operation energy source is not available, and it is therefore advantageous to further provide the wind turbine with a dedicated emergency hydraulic pump because such a pump makes it simpler to adapt the capacity to the emergency situation and thereby ensure lower energy consumption during the periods when the normal operation energy source is not available. Hereby, operation of the pitch system is ensured over a long period of time (i.e., weeks and months) by means of a relatively small and inexpensive electrical energy storage. Furthermore, powering the separate dedicated emergency hydraulic pump by an electrical energy storage is advantageous in that it enables adjustment of the pitch angle of the blades even if the utility grid is not available or if the drive train is not rotating.

Also, by making the emergency hydraulic pump separate from the normal operation actuator hydraulic pumps, redundancy is ensured in that if the actuator hydraulic pumps for some reason break down or stop functioning, the emergency hydraulic pump is able to operate the pitch system and pitch the blades to a safe position.

It should be emphasised that by the term "a normal operation energy source" is to be understood any kind of energy source capable of powering the one or more actuator hydraulic pumps during normal operation of the wind turbine, i.e., when the wind turbine rotor is rotating whereby electrical power is generated and fed directly or indirectly to the utility grid.

The normal operation energy source would in most cases be the utility grid, but it could also be a direct or indirect coupling to the wind turbine drive train—such as if the pump was driven by an output shaft on the wind turbine generator or if the pump comprised an electrical motor being powered by a dedicated generator being driven by the wind turbine drive train or the electrical motor could be driven directly by the wind turbine main generator or generators.

It should also be emphasised that by the term "an electrical energy storage" is to be understood any kind of batteries, electrical accumulators, condensates/capacitors or similar devices capable of storing electrical energy.

In an aspect of the invention, the emergency hydraulic pump is a fixed capacity hydraulic pump.

A fixed capacity hydraulic pump is more simple, reliable and inexpensive than a variable capacity hydraulic pump and since the emergency hydraulic pump is only supposed to operate very rarely in case of failure to the normal pump system—such as grid failure or the like—it is particularly important that the pump is reliable. Furthermore, since the demand on the pitch drive system is severely reduced when the wind turbine is not operating normally, i.e., not producing power to the utility grid, it is advantageous to use a "simple" and reliable fixed capacity hydraulic pump during these periods.

It should be emphasised that by the term "fixed capacity hydraulic pump" is to be understood a hydraulic pump having a direct correlation between the input RPM (Rotations Per Minute) and the output oil amount. Known types of fixed capacity hydraulic pumps are gear pumps, screw pumps and radial piston pumps, but other pump types are feasible for use as a fixed capacity hydraulic pump such as rotary vane pumps, bent axis pumps and axial piston pumps.

In an aspect of the invention, the one or more actuator hydraulic pumps are one or more variable capacity hydraulic pumps.

Variable capacity hydraulic pumps are more energy efficient which is advantageous in that the pumps have to be running substantially constantly during normal operation of the wind turbine and given the ability to vary the capacity. This pump type is particularly suited for powering hydraulic pitch actuators in that the pitch demand varies constantly and rapidly.

It should be emphasised that by the term "variable capacity hydraulic pump" is to be understood hydraulic pumps comprising an adjustment mechanism or means for mechanically adjusting or varying the capacity of the pump by increasing or reducing the volume of oil being delivered by the pump per revolution. Known types of variable capacity hydraulic pumps are rotary vane pumps, bent axis pumps and axial piston pumps but other pump types are feasible for use as a variable capacity hydraulic pump.

In an aspect of the invention, the capacity of each of the one or more actuator hydraulic pumps is between 2 and 100, preferably between 5 and 20 and most preferred between 7 and 15 times greater than the capacity of the emergency hydraulic pump.

If the capacity of the emergency hydraulic pump is too small in relation to the capacity of the actuator hydraulic pumps, the emergency hydraulic pump will not be able to provide enough power to the pitch actuators to ensure that the blades can be pitched, for example, before edgewise oscillations of the blades build up to a potentially damaging level. However, if the capacity of the emergency hydraulic pump is too big in relation to the capacity of the actuator hydraulic pumps the emergency hydraulic pump becomes too expensive and it will require too much power to run. Thus, the present size ranges presents an advantageous relation between efficiency and cost.

In an aspect of the invention, the emergency hydraulic pump has a capacity of between 0.5 and 100 liters/minute, preferably between 1 and 30 liters/minute and most preferred between 2 and 10 liters/minute.

These size ranges presents an advantageous capacity for pitching the blades of a large modern wind turbine at a sufficient speed to ensure that edgewise oscillations of the blades do not build up to a potentially damaging level before the blades are pitched.

In an aspect of the invention, the wind turbine further comprises a status detector or status detection means for detecting an indication of the operational status of the actuator hydraulic pumps.

Since the electrical energy storage of the emergency hydraulic pump is of limited capacity, it is advantageous to only operate the emergency hydraulic pump when it is needed. It is therefore advantageous to provide the wind turbine with a status detector or status detection means for detecting situations where the emergency hydraulic pump should be allowed to operate.

The status detector or status detection means could, for example, be arranged to detect one or more of the following scenarios: Utility grid failure, pressure drop (or complete loss) in the hydraulic system, operational status of the one or more actuator hydraulic pumps, pitch angle of the blade, i.e., are the blades turned to the correct position, and grid engagement status, i.e., is the wind turbine disconnected (e.g. during service) or connected to the utility grid. If one or more of these states were detected by the operational status detector or status detection means, it would trigger that operation of the emergency hydraulic pump is possible.

The status detector or status detection means could be any kind of sensors—such as temperature sensors, pressure sensors, voltmeters or ammeters—or any other kind of electronic or mechanical device suitable for acting as a status detector capable of detecting an indication of the operational status of the actuator hydraulic pumps.

In an aspect of the invention, the status detector or status detection means comprises a grid status detector or grid status detection means for detecting if the utility grid is available.

Non-availability of the utility grid—either due to grid failure or because the wind turbine is deliberately disconnected from the utility grid—is by far the most common reason why normal operation of the one or more actuator hydraulic pumps is not possible, and it is therefore particularly advantageous to provide the status detector or status detection means with a grid status detector or grid status detection means for detecting if the utility grid is available.

The grid status detector or grid status detection means could be a voltmeter, a ammeter or any other kind of electronic or mechanical devise suitable for acting as a grid status detector capable of detecting if the utility grid is available.

In an aspect of the invention, the wind turbine further comprises a controller or control means for enabling operation of the emergency hydraulic pump in dependency of an output from the status detector or status detection means.

Hereby is achieved an advantageous embodiment of the invention. The controller or control means could be any kind of PLC, microprocessor, PC or any other any other kind of electronic or mechanical device suitable for acting as a controller capable of enabling operation of the emergency hydraulic pump in dependency of an output from the status detector or status detection means.

In an aspect of the invention, the electrical energy storage is one or more batteries.

Batteries are a very reliable, inexpensive and simple way of storing energy over long periods of time, and it is therefore advantageous to use batteries for powering an emergency hydraulic pump of a wind turbine.

In an aspect of the invention, the wind turbine further comprises an oscillation detector or oscillation detection means adapted for detecting edgewise oscillations in one or more of the one or more blades.

As previously explained, since the electrical energy storage of the emergency hydraulic pump is of limited capacity, it is advantageous to only operate the emergency hydraulic pump when it is needed. It is therefore advantageous to provide the wind turbine with an oscillation detector or oscillation detection means enabling that the emergency hydraulic pump is substantially only operated when specific scenarios occur, such as when edgewise oscillations are detected in one or more of the blades.

The oscillation detector or oscillation detection means could be any kind of sensors, strain gauges, accelerometers, fibre optic cables, cameras or any other any other kind of electronic or mechanical devices suitable for acting as an oscillation detector capable of detecting edgewise oscillations in one or more of the wind turbine blades.

In an aspect of the invention, the wind turbine further comprises emergency hydraulic pump controller or control means adapted for activating the emergency hydraulic pump if the oscillation detector or oscillation detection means detects edgewise oscillations above a predefined level in one or more of the one or more blades.

Since the power available for driving the emergency hydraulic pump is limited, it is advantageous to only operate the emergency hydraulic pump when the edgewise oscillations are above a predefined level, indicating that the oscillations are not stopping on their own and ensuring that the oscillations are stopped before they reach a dangerous level.

In an aspect of the invention, the electrical energy storage is one or more capacitors.

Using capacitors is advantageous in that they provided for a simple, durable and inexpensive energy storage.

In an aspect of the invention, the normal operation energy source is the utility grid.

It is advantageous to power the one or more actuator hydraulic pumps by means of the utility grid in that the utility grid provides for a inexpensive an reliable energy source during normal operation of the wind turbine.

An embodiment of the invention further provides for a method for powering one or more hydraulic pitch actuators for actively controlling the pitch angle of one or more blades of a wind turbine. The hydraulic pitch actuators are driven by means of one or more actuator hydraulic pumps during normal operation of the wind turbine, and the actuator hydraulic pumps are powered by a normal operation energy source. The method comprises the steps of:

detecting an indication of the operational status of the actuator hydraulic pumps, and enabling that the hydraulic pitch actuators can be powered by an emergency hydraulic pump if a non-operational status of the actuator hydraulic pumps is detected. The emergency hydraulic pump is powered by an electrical energy storage.

It is advantageous to power the emergency hydraulic pump by means of an electrical energy storage in that if a non-operational status of the actuator hydraulic pumps is detected, this status might be caused by a grid failure or other scenarios entailing that the normal operation power source is unavailable. And by making the electrical energy storage drive a separate emergency hydraulic pump, it is possible to adapt this pump specifically to the special circumstances occurring when a non-operational status of the actuator hydraulic pumps is detected, i.e., the wind turbine is not producing power, thus, quick reaction or constant reaction of the pitch system is not required. However, since the amount of power available from an electrical energy storage by nature is limited, it is also advantageous that the emergency hydraulic pump is only operated when a non-operational status of the actuator hydraulic pumps is detected.

In an aspect of the invention, the aid method further comprises the step of activating the emergency hydraulic pump if edgewise oscillations above a predefined level are detected in one or more of the wind turbine blades.

Since the amount of power available from the electrical energy storage by nature is limited, it is also advantageous that the emergency hydraulic pump is only operated when it is absolutely needed—when the non-operational status of the actuator hydraulic pumps is detected. Thus, it is advantageous that the emergency hydraulic pump is only activated if edgewise oscillations above a predefined level are detected in one or more of the blades.

In an aspect of the invention, the method is a method for powering one or more hydraulic pitch actuators of a wind turbine according to any of the wind turbines mentioned above.

BRIEF DESCRIPTION OF THE FIGURES

A few exemplary embodiments of the invention will be described in the following with reference to the figures, of which.

DETAILED DESCRIPTION

Figure 1:
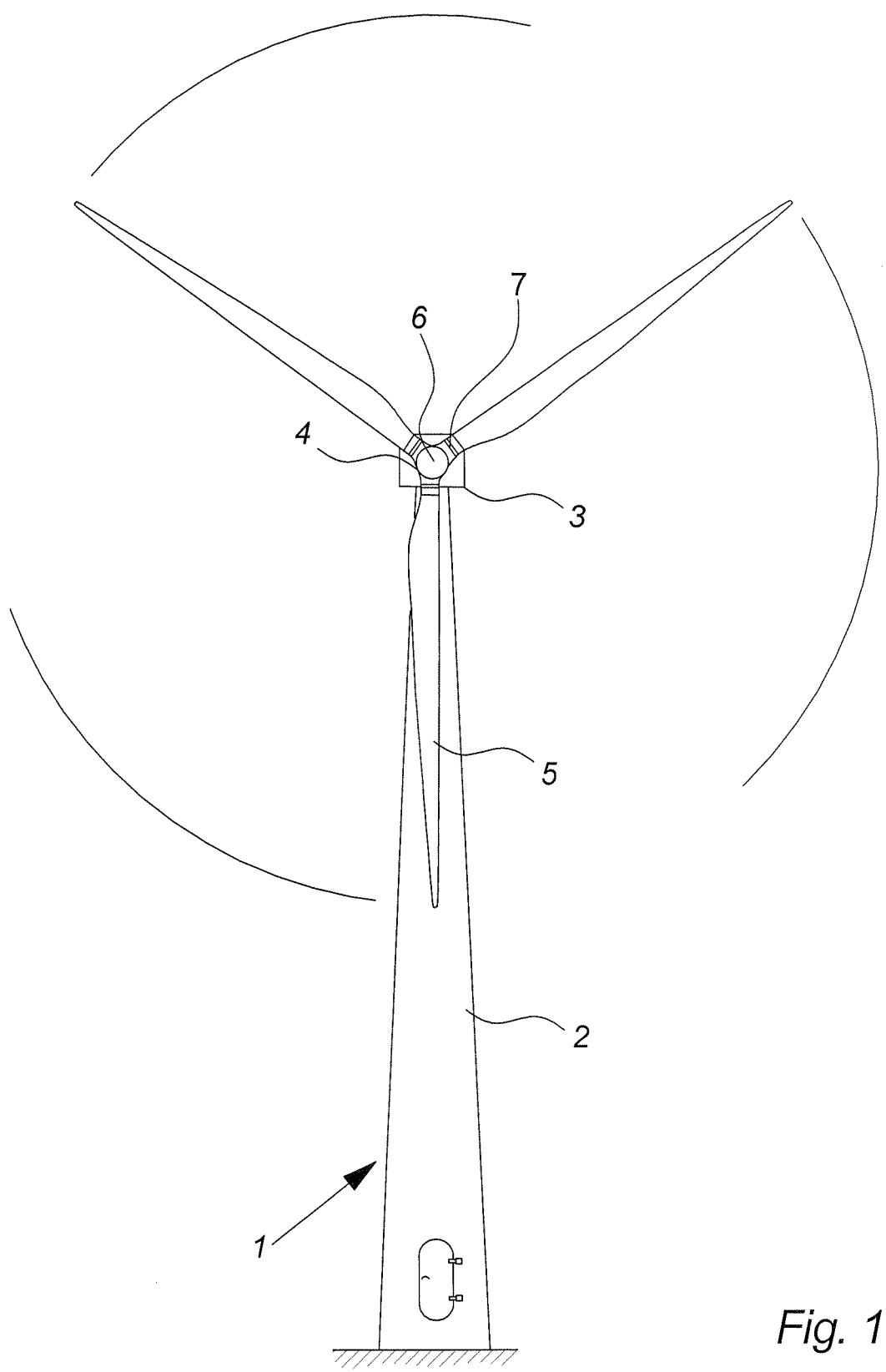
FIG. 1 illustrates a large modern wind turbine as seen from the front.

FIG. 1 illustrates a modern wind turbine 1 comprising a tower 2 and a wind turbine nacelle 3 positioned on top of the tower 2. The wind turbine rotor 4, comprising three wind turbine blades 5 mounted on a hub 6, is connected to the nacelle 3 through a low speed shaft which extends out of the front of the nacelle 3. Furthermore, the figure shows that pitch bearings 7 are mounted at the roots of the blades 5.

Figure 2:
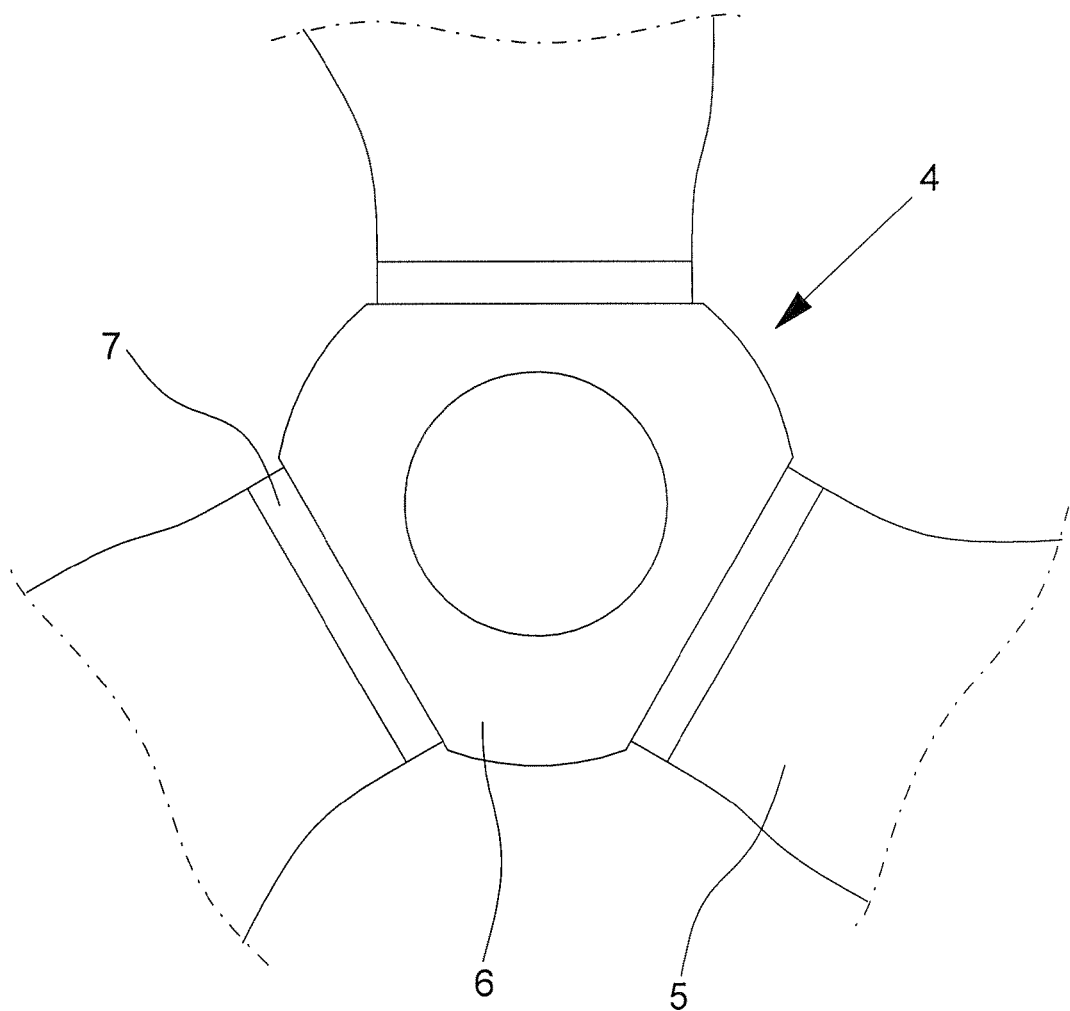
FIG. 2 illustrates a wind turbine rotor comprising three blades, as seen from the front.

FIG. 2 illustrates a wind turbine rotor 4 comprising a hub 6 and three blades 5 as seen from the front.

As illustrated, the pitch bearings 7 are arranged between the blades 5 and the hub 6 to enable the blades 5 to be rotated around their longitudinal axis and to transfer forces mainly from three different sources. The blades 5 (and the bearings 7 themselves, of course) are under constant influence of the force of gravitation. The direction of the gravitational force varies depending on the positions of the blades 5, inducing different loads on the pitch bearings 7. When the blades are in motion, the bearings 7 are also under influence of a centrifugal force, which mainly produces an axial pull in the bearings 7. Finally the bearings 7 are under influence of the wind load on the blades 5. This force is by far the greatest load on the bearings 7 and it produces a massive moment, which the bearings 7 have to stand.

The load on and from all the pitch bearings 7 has to be transferred to the hub 6 and further into the rest of the wind turbine 1, and each pitch bearing 7 must, at the same time, enable that the blade 5 can be pitched.

In the shown embodiment, the rotor 4 comprises three blades 5, but in other embodiments the rotor 4 could comprise one, two, four or more blades 5.

In the shown embodiment, the wind turbine 1 is a pitch regulated wind turbine 1, but in other embodiments the wind turbine could just as well be an active stall regulated wind turbine 1, since both pitch regulated wind turbines 1 and active stall regulated wind turbines 1 comprise a pitch mechanism for pitching the blades 5.

Figure 3:
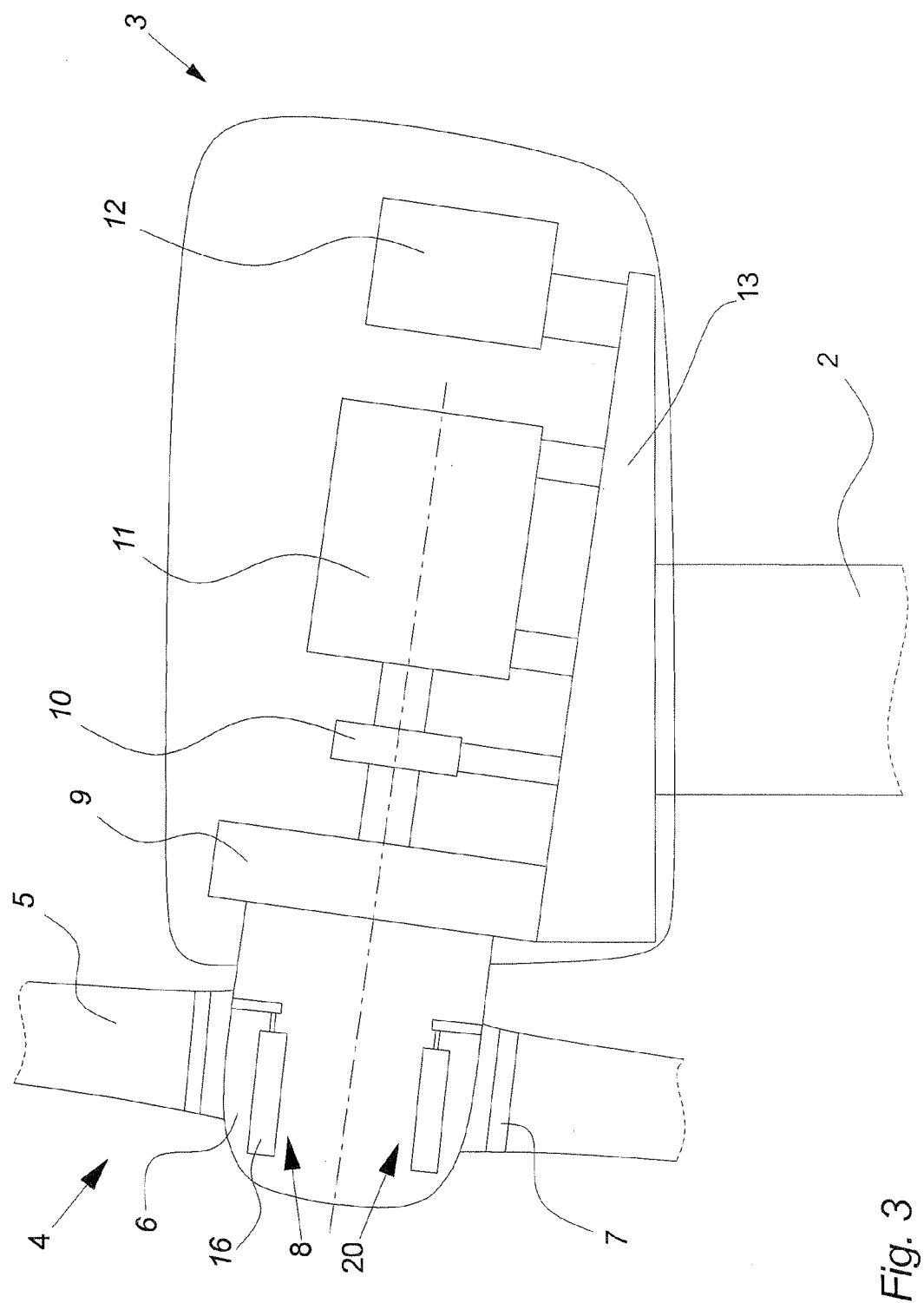
FIG. 3 illustrates a simplified cross section of a wind turbine nacelle as seen from the side.

FIG. 3 illustrates a simplified cross section of a nacelle 3 of a wind turbine 1 as seen from the side. Nacelles 3 exist in a multitude of variations and configurations, but in most cases the drive train in the nacelle 3 comprises one or more of the following components: a gearbox 9, a coupling (not shown), some sort of braking system 10 and a generator 11. A nacelle 3 of a modern wind turbine 1 can also include a converter 12 (also called an inverter) and additional peripheral equipment such as further power handling equipment, control cabinets, hydraulic systems, cooling systems and more.

The weight of the entire nacelle 3 including the nacelle components 9, 10, 11, 12 is carried by a nacelle structure 13. The components 9, 10, 11, 12 are usually placed on and/or connected to this common load carrying nacelle structure 13. In the simplified embodiment shown, the load carrying nacelle structure 13 only extends along the bottom of the nacelle 3, e.g., in the form of a bed frame to which some or all of the components 9, 10, 11, 12 are connected. In other embodiments, the load carrying structure 13 could comprise a gear bell which could transfer the load of the rotor 4 to the tower 2 through a main bearing (not shown), or the load carrying structure 13 could comprise several interconnected parts, such as latticework.

In the illustrated embodiment, the blades 5 of the wind turbine 1 are connected to the hub 6 through pitch bearings 7 enabling the blades 5 to be rotated around their longitudinal axis. In this embodiment, a blade pitch drive 8 is connected to a first blade 5 and a second blade pitch drive 20 is connected to a second blade 5. Each of the blade pitch drives 8, 20 comprises adjustment mechanism or means for actively adjusting the blade pitch angle in the form of, for example, hydraulic actuators 16 connected to the hub 6 and the respective blades 5.

Figure 4:
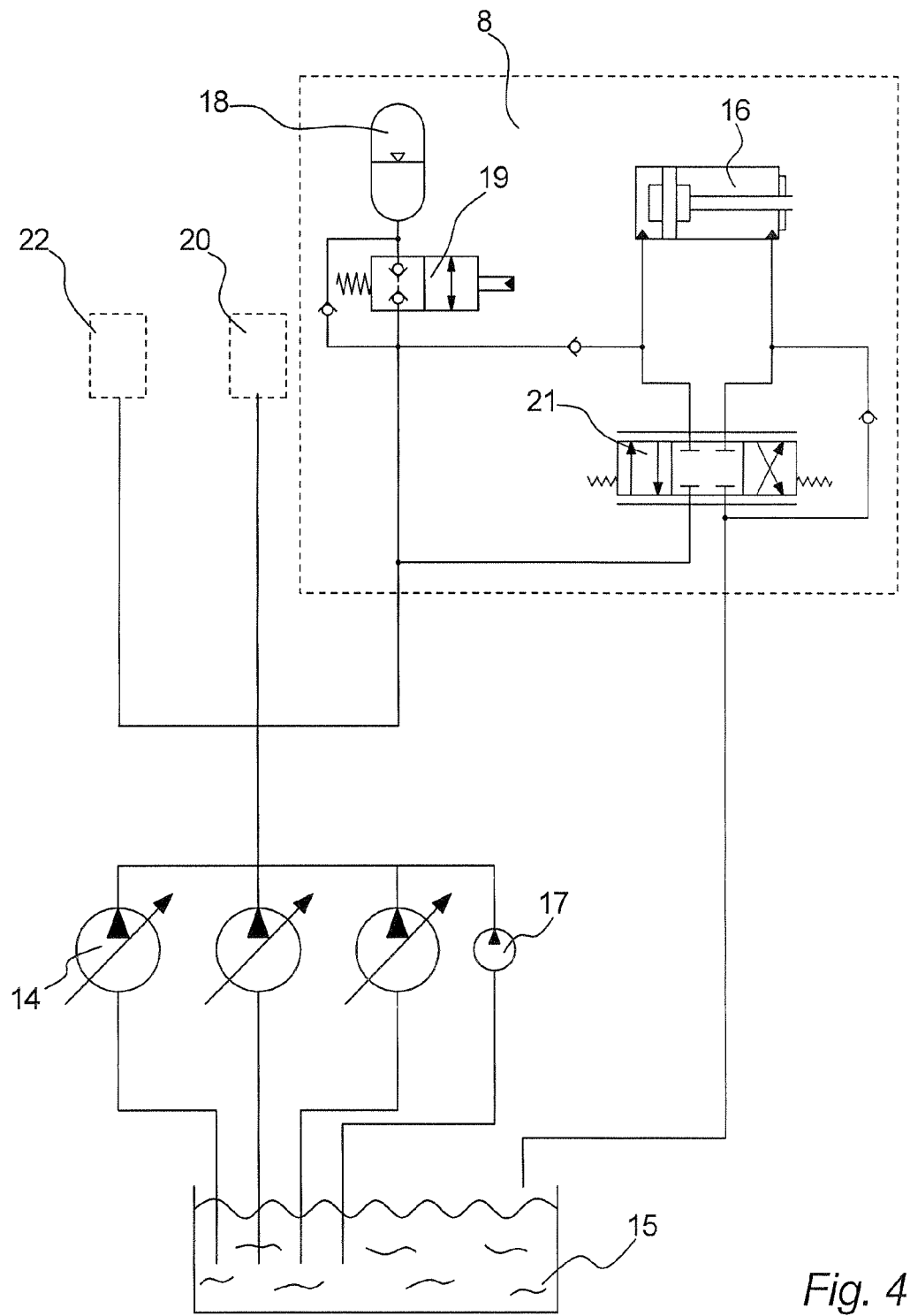
FIG. 4 is a diagram of main components of a hydraulic blade pitch system for a wind turbine blade.

FIG. 4 is a diagram of main components of a hydraulic blade pitch system for a wind turbine blade 5.

In this embodiment of the invention, the wind turbine 1 comprises three wind turbine blades 5 each comprising a blade pitch drive 8, 20, 22. In this embodiment only the blade pitch drive 8 for the first blade 5 is specifically illustrated and the presence of the blade pitch drives 20, 22 for the second and the third blade 5 is only indicated by empty boxes 20, 22. However, the blade pitch drives 20, 22 for the second and the third blade 5 are in principle similar to the illustrated blade pitch drive 8 for the first blade 5.

In this embodiment of the invention, the hydraulic blade pitch system comprises three actuator hydraulic pumps 14 and one emergency hydraulic pump 17 all being coupled in parallel. In another embodiment of the invention, the hydraulic blade pitch system could comprise another number of actuator hydraulic pumps 14 such as one, two, four or more and the system could comprise another number of emergency hydraulic pumps 17, such as two, three, four or more, and the pumps 14, 17 could be coupled differently.

In this embodiment of the invention, all the actuator hydraulic pumps 14 are variable capacity hydraulic pumps, but in another embodiment, one or more of the actuator hydraulic pumps 14 could be fixed capacity hydraulic pumps. Similarly, in this embodiment, the emergency hydraulic pump 17 is a fixed capacity hydraulic pump, but in another embodiment it could be a variable capacity hydraulic pump.

In this embodiment of the invention, the hydraulic pumps 14, 17 feed a suitable pressurized hydraulic liquid—such as hydraulic oil—to the pitch drives 8, 20, 22 in which the liquid is led to one side of the piston in the hydraulic pitch actuator 16 by means of a valve 21, which in this embodiment is a proportional valve 21.

The piston rod of the hydraulic pitch actuator 16 is connected (not shown) directly or indirectly to the hub 6 of the wind turbine rotor 4, and the cylinder housing of the hydraulic pitch actuator 16 is directly or indirectly connected to the blade 5, or vice versa, so as to effect an angular displacement (pitching) of the blade 5 when liquid under pressure is applied to either side of the piston in the hydraulic pitch actuator 16.

In this embodiment, the pitch drive 8 also comprises a hydraulic accumulator 18 also being pressurised by the pressurized liquid from the pumps 14, 17. If, for example, during high wind and maximum power production, the utility grid suddenly fails, the blades 5 will have to be pitched out of the wind very fast to prevent the rotor speed from increasing, which could lead to a catastrophic failure. In this embodiment of the invention, the actuator hydraulic pumps 14 are powered by the utility grid and when the grid fails the actuator hydraulic pumps 14 are not able to provide the pressure for feathering the blades 5. In such cases, the pressurized liquid inside the hydraulic accumulator 18 is released by means of the accumulator valve 19 thereby providing an instant, although short-lived, pressure increase providing enough power to pitch the blades to a "safe" feathered position.

In another embodiment of the invention, the pitch drive would not comprise a hydraulic accumulator 18 and the emergency pitching of the blades 5, in case of grid failure or similar, would be performed entirely by means of the pressurized liquid provided by the emergency hydraulic pump 17. Alternatively, the emergency pitching of the blades 5 could be performed in a collaboration between a pressure back-up system, such as one or more hydraulic accumulators 18, and the emergency hydraulic pump 17.

Once the blades 5 have reached their parking position, there would, in principle, be no need for pitching the blades 5 again until normal power production is resumed, where they again could be pitched by means of the actuator hydraulic pumps 14. However, to avoid standstill-marks forming in the bearings and the gears of the wind turbine drive train, it is advantageous that the rotor 4, and thereby the drive train, is constantly idling at least during longer periods of standstill. To ensure this constant idling of the rotor 4 without the rotation building up or stopping, it is necessary to occasionally adjust the pitch angle of one or more of the blades 5. Likewise, during standstill, turbulence and similar wind phenomenon can cause edgewise vibrations to build up in the blades 5. Edgewise vibrations above a certain level can lead to cracks in the blades structure, and to prevent the vibrations from building up, it is advantageous to pitch the affected blade 5 to remove or reduce the conditions causing the blade 5 to vibrate edgewise. Also, during erection or service of the wind turbine 1, where the wind turbine 1 would be disconnected from the utility grid, a need for pitching the blades 5 could arise.

Thus, it is advantageous to provide the wind turbine with an emergency hydraulic pump 17 being powered by a battery or a similar electrical energy storage 29 so that the blades 5 may be pitched even if the normal operation energy source, such as the utility grid, is not available over a long period of time.

In this exemplary embodiment of the invention, the hydraulic pumps 14, 17 are arranged for providing pressurised liquid to the hydraulic blade pitch systems for all of the blades 5, but in another embodiment, a set of pumps 14, 17 may be arranged separately for each blade 5.

It is evident to the skilled person that the system is shown only schematically in FIG. 4 and that a number of variations to the system would be possible, for example, including other ways to control the flow of the liquid to and from the accumulator 18 and the pitch cylinder 16 and to control the interaction between the pitch drive components.

Figure 5:
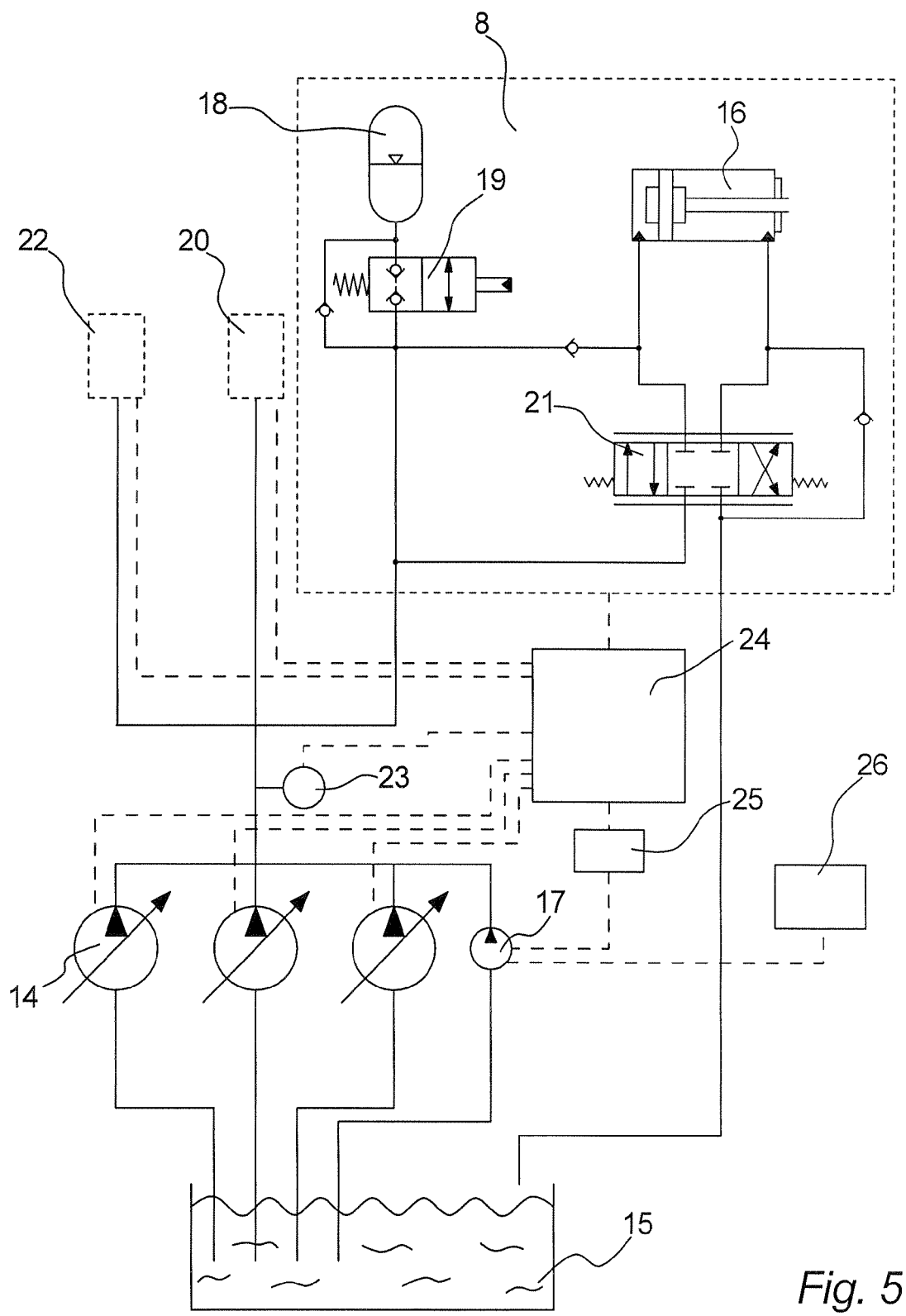
FIG. 5 is a diagram of main components and control devices of a hydraulic blade pitch system for a wind turbine blade.

FIG. 5 is a diagram of main components and control devices of a hydraulic blade pitch system for a wind turbine blade 5.

In this embodiment of the invention, the wind turbine 1 is further equipped with a status detector or status detection means 24. The status detector or status detection means 24 is adapted to detecting if the actuator hydraulic pumps 14 are working properly, i.e., for detecting an indication of the operational status of the actuator hydraulic pumps 14. In this embodiment of the invention, the status detector or status detection means 24 comprises grid status detector or detection means, e.g., in the form of a voltmeter or an ammeter (not shown) for detecting if the utility grid is available, a switch position detector (not shown) for detecting the switch position of the main turbine switch connecting the turbine 1 to the utility grid, a pressure gauge 23 measuring the pressure of the liquid in one or more places in the pitch system, and a temperature sensor (not shown) for detecting an overheat situation of the actuator hydraulic pumps 14. However, in another embodiment of the invention, the status detector or detection means 24 could comprise fewer detectors, such as in one embodiment, the status detector or detection means 24 would only comprise the grid status detector or detection means, or in another embodiment the status detector or detection means 24 could comprises other detectors or another combination of detectors capable of detecting an indication of the operational status of the actuator hydraulic pumps 14.

In this embodiment, the status detector or detection means 24 is arranged centrally, but in another embodiment the status detector or detection means 24 would be arranged at different locations in the wind turbine 1.

One or more signals from the status detector or status detection means 24 is fed to controller or control means 25 and if these signals indicate that the operational status of the actuator hydraulic pumps 14 is not as it is supposed to be, the controller or control means 25 will enable that the emergency hydraulic pump 17 may operate. Thus, if the status detector or status detection means 24, for example, detects that the utility grid is no longer available, this information is provided to the controller or control means 25 which will enable operation of the emergency hydraulic pump 17. This does not necessary mean that the emergency hydraulic pump 17 will start operating immediately. For example, if the blade has already been feathered by means of the normal operation actuator hydraulic pumps 14, the emergency hydraulic pump 17 would not start operating until, for example, it was detected that the rotational speed of the idling rotor 4 increased beyond a predefined level or if the oscillation detector or oscillation detection means 26 detected than one or more of the blades 5 was oscillating edgewise.

In this embodiment the controller or control means 25 are shown as a separate device, such as a separate microprocessor, a PLC or a similar control device, but in another embodiment the control means 25 could be an integrated part of another control device in the wind turbine 1 such as the wind turbine main controller.

Compared to the actuator hydraulic pumps 14, the emergency hydraulic pump 17 is of a relatively small size, i.e., the emergency hydraulic pump 17 has, for example, a capacity which is ten times smaller than the capacity of each of the actuator hydraulic pumps 14. This means that the pitch speed is severely reduced when the pitch system is powered only by the emergency hydraulic pump 17, but it also means that the size of the electrical energy storage 29 powering the emergency hydraulic pump 17 can be severely reduced.

Figure 6:
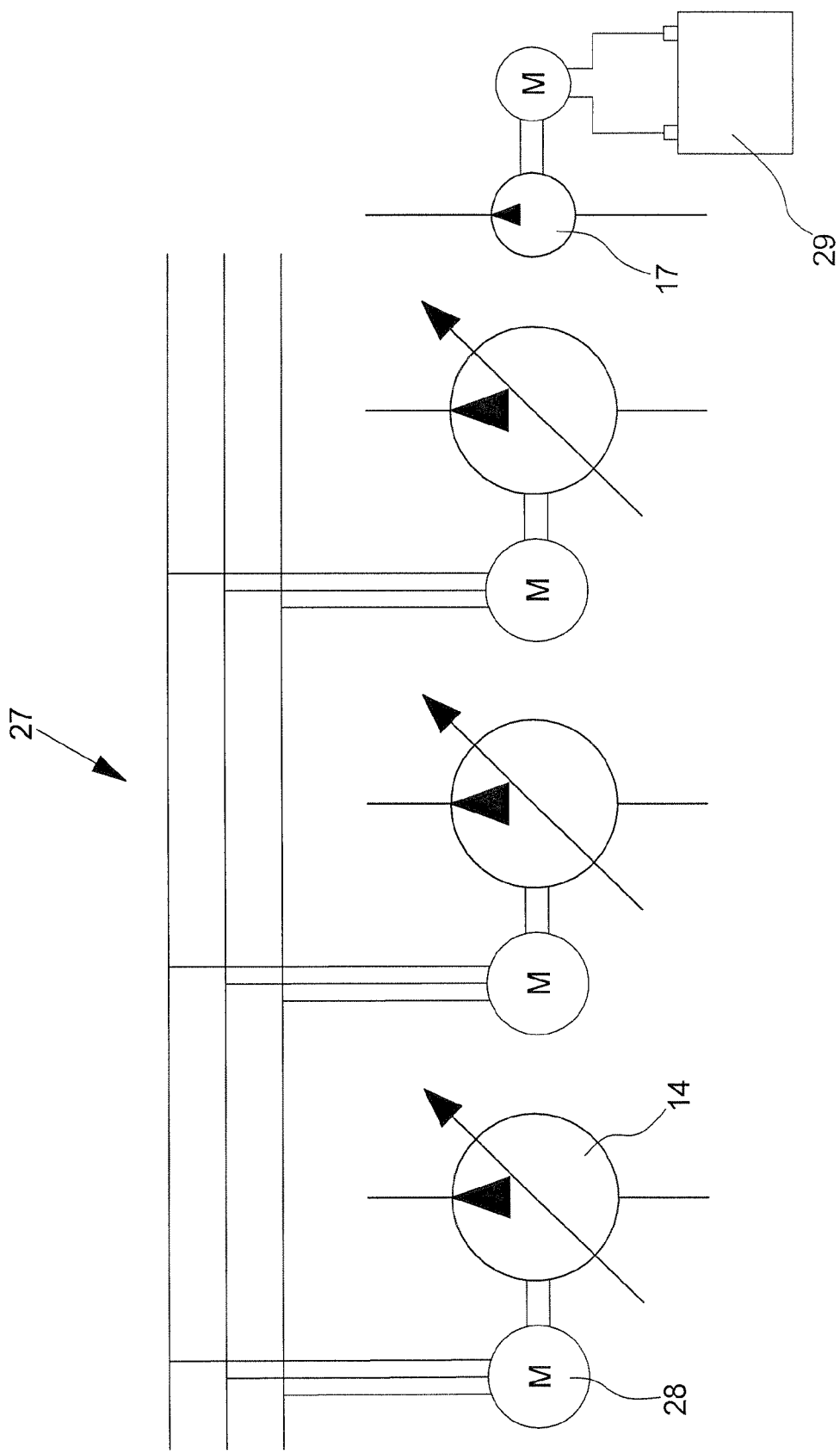
FIG. 6 is an electrical diagram of the hydraulic pumps of a hydraulic blade pitch system for a wind turbine.

FIG. 6 is an electrical diagram of the hydraulic pumps 14, 17 of a hydraulic blade pitch system for a wind turbine 1.

In this embodiment of the invention, the three actuator hydraulic pumps 14 are each driven by means of electrical motors 28 and the normal operation energy source is in this case the utility grid 27 to which the power produced by the wind turbine 1 is delivered.

The emergency hydraulic pump 17 is also driven by means of an electrical motor 28 and the electrical energy storage powering the electrical motor 28 is in this case a battery.

The invention has been exemplified above with reference to specific examples of wind turbines 1, pitch drives 8, 20, 22, hydraulic pitch systems and other. However, it should be understood that the invention is not limited to the particular examples described above but may be designed and altered in a multitude of varieties within the scope of the invention as specified in the claims.

LIST OF REFERENCE NUMBERS

1. Wind turbine
2. Tower
3. Nacelle
4. Rotor
5. Blade
6. Hub
7. Pitch bearing
8. Blade pitch drive for $1^{st}$ blade
9. Gearbox
10. Brake
11. Generator
12. Converter
13. Nacelle structure
14. Actuator hydraulic pump
15. Tank
16. Hydraulic pitch actuator
17. Emergency hydraulic pump
18. Hydraulic accumulator
19. Accumulator valve
20. Blade pitch drive for $2^{nd}$ blade
21. Hydraulic valve
22. Blade pitch drive for $3^{rd}$ blade
23. Pressure gauge
24. Status detector or detection means
25. Controller or control means
26. Oscillation detector or detection means
27. Utility grid
28. Electric motor
29. Electrical energy storage

The invention claimed is:

1. A wind turbine for producing power to a utility grid, the wind turbine comprising:
   a rotor including one or more blades, wherein said rotor further comprises one or more hydraulic pitch actuators for actively controlling the pitch angle of one or more of said blades,
   one or more actuator hydraulic pumps adapted for powering said hydraulic pitch actuators and wherein said one or more actuator hydraulic pumps are powered by a normal operation energy source, and wherein said wind turbine further comprises an emergency hydraulic pump also adapted for powering said hydraulic actuators, said emergency hydraulic pump being powered by an electrical energy storage.

2. The wind turbine according to claim 1, wherein said emergency hydraulic pump is a fixed capacity hydraulic pump.

3. The wind turbine according to claim 1, wherein said one or more actuator hydraulic pumps are one or more variable capacity hydraulic pumps.

4. The wind turbine according to claim 1, wherein the capacity of each of said one or more actuator hydraulic pumps is between 2 and 100 times greater than the capacity of said emergency hydraulic pump.

5. The wind turbine according to claim 4, wherein the capacity of each of said one or more actuator hydraulic pumps is between 5 and 20 times greater than the capacity of said emergency hydraulic pump.

6. The wind turbine according to claim 4, wherein the capacity of each of said one or more actuator hydraulic pumps is between 7 and 15 times greater than the capacity of said emergency hydraulic pump.

7. The wind turbine according to claim 1, wherein said emergency hydraulic pump has a capacity of between 0.5 and 100 liters/minute.

8. The wind turbine according to claim 7, wherein said emergency hydraulic pump has a capacity of between 1 and 30 liters/minute.

9. The wind turbine according to claim 7, wherein said emergency hydraulic pump has a capacity of between 2 and 10 liters/minute.

10. The wind turbine according to claim 1, wherein said wind turbine further comprises a status detector for detecting an indication of the operational status of said actuator hydraulic pumps.

11. The wind turbine according to claim 10, wherein said status detector comprises a grid status detector for detecting if the utility grid is available.

12. The wind turbine according to claim 10, wherein said wind turbine further comprises a controller for enabling operation of said emergency hydraulic pump in dependency of an output from said status detector.

13. The wind turbine according to claim 1, wherein said electrical energy storage is one or more batteries.

14. The wind turbine according to claim 1, wherein said wind turbine further comprises an oscillation detector adapted for detecting edgewise oscillations in one or more of said one or more blades.

15. The wind turbine according to claim 14, wherein said wind turbine further comprises an emergency hydraulic pump controller adapted for activating said emergency hydraulic pump if said oscillation detector detects edgewise oscillations above a predefined level in one or more of said one or more blades.

16. A wind turbine according to claim 1, wherein said electrical energy storage is one or more capacitors.

17. A method for powering one or more hydraulic pitch actuators for actively controlling the pitch angle of one or more blades of a wind turbine, the hydraulic pitch actuators being driven by means of one or more actuator hydraulic pumps during normal operation of the wind turbine, wherein the actuator hydraulic pumps are powered by a normal operation energy source and wherein the method comprises:

detecting an indication of the operational status of the actuator hydraulic pumps, and enabling that the hydraulic pitch actuators can be powered by an emergency hydraulic pump if a non-operational status of the actuator hydraulic pumps is detected, the emergency hydraulic pump being powered by an electrical energy storage.

18. The method according to claim 17, wherein the method further comprises activating the emergency hydraulic pump if edgewise oscillations above a predefined level are detected in one or more of the wind turbine blades.

* * * * *